(12) United States Patent
Ee et al.

(10) Patent No.: US 8,699,484 B2
(45) Date of Patent: Apr. 15, 2014

(54) METHODS AND APPARATUS TO ROUTE PACKETS IN A NETWORK

(75) Inventors: Cheng Tien Ee, Rockaway, NJ (US); Lee M. Breslau, Basking Ridge, NJ (US); Kadangode K. Ramakrishnan, Berkeley Heights, NJ (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 388 days.

(21) Appl. No.: 12/786,157

(22) Filed: May 24, 2010

(65) Prior Publication Data

US 2011/0286342 A1    Nov. 24, 2011

(51) Int. Cl.
*H04L 12/28* (2006.01)
*H04L 12/56* (2011.01)
*H04J 3/24* (2006.01)

(52) U.S. Cl.
USPC ............................ 370/389; 370/401; 370/473

(58) Field of Classification Search
None
See application file for complete search history.

(56) References Cited

U.S. PATENT DOCUMENTS

| | | | |
|---|---|---|---|
| 5,841,775 A | 11/1998 | Huang | |
| 5,917,820 A | 6/1999 | Rekhter | |
| 5,951,651 A | 9/1999 | Lakshman et al. | |
| 5,991,300 A | 11/1999 | Tappan | |
| 6,044,080 A | 3/2000 | Antonov | |
| 6,070,187 A | 5/2000 | Subramaniam et al. | |
| 6,081,522 A | 6/2000 | Hendel et al. | |
| 6,088,356 A | 7/2000 | Hendel et al. | |
| 6,094,435 A | 7/2000 | Hoffman et al. | |
| 6,192,051 B1 | 2/2001 | Lipman et al. | |
| 6,253,230 B1 | 6/2001 | Couland et al. | |
| 6,256,314 B1 | 7/2001 | Rodrig et al. | |
| 6,259,699 B1 | 7/2001 | Opalka et al. | |
| 6,397,260 B1 | 5/2002 | Wils et al. | |
| 6,438,671 B1 | 8/2002 | Doing et al. | |
| 6,473,431 B1 | 10/2002 | Perlman et al. | |
| 6,529,475 B1 | 3/2003 | Wan et al. | |
| 6,563,823 B1 | 5/2003 | Przygienda et al. | |
| 6,625,650 B2 | 9/2003 | Stelliga | |
| 6,665,495 B1 * | 12/2003 | Miles et al. | ............ 398/54 |
| 6,680,942 B2 | 1/2004 | Mead et al. | |
| 6,683,874 B1 | 1/2004 | Nagami | |
| 6,721,334 B1 | 4/2004 | Ketcham | |

(Continued)

OTHER PUBLICATIONS

Chang et al., "An Empirical Study of Router Response to Large BGP Routing Table Load," Internet Measurement Conference; Proceedings of the 2$^{nd}$ ACM SIGCOMM Workshop on Internet Measurement, held in Marseille, France, pp. 203-208, 2002 (6 pages).

(Continued)

*Primary Examiner* — Xavier Szewai Wong
(74) *Attorney, Agent, or Firm* — Hanley, Flight & Zimmerman, LLC (57) ABSTRACT

Methods and apparatus to route packets in a network are disclosed. A disclosed example method includes receiving a packet in a packet aggregator, accessing a forwarding table to determine a router within a router array to which the packet is to be forwarded, transmitting the packet to the determined router via a first interface of the packet aggregator, identifying a second interface within the router to which the packet is to be forwarded, forwarding the packet from the router via the second interface to a virtual interface within the packet aggregator, and statically forwarding the packet from the packet aggregator to a destination based on the virtual interface that received the packet.

19 Claims, 7 Drawing Sheets

(56) References Cited

U.S. PATENT DOCUMENTS

| | | | |
|---|---|---|---|
| 6,771,673 B1 | 8/2004 | Baum et al. | |
| 6,820,132 B1 | 11/2004 | Puente et al. | |
| 6,826,613 B1 | 11/2004 | Wang et al. | |
| 6,847,643 B2 | 1/2005 | Nie | |
| 6,850,525 B2 | 2/2005 | Mitsumori et al. | |
| 6,873,620 B1 | 3/2005 | Coveley et al. | |
| 6,873,627 B1 | 3/2005 | Miller et al. | |
| 6,996,630 B1 | 2/2006 | Masaki et al. | |
| 7,012,919 B1 | 3/2006 | So et al. | |
| 7,024,487 B2 | 4/2006 | Mochizuki et al. | |
| 7,046,680 B1 | 5/2006 | McDysan et al. | |
| 7,065,038 B1 | 6/2006 | Brandt et al. | |
| 7,190,678 B2 | 3/2007 | Thubert et al. | |
| 7,209,439 B2 | 4/2007 | Rawlins et al. | |
| 7,362,702 B2 | 4/2008 | Terrell et al. | |
| 7,362,707 B2 | 4/2008 | MeLampy et al. | |
| 7,411,965 B2 | 8/2008 | Chu et al. | |
| 7,467,227 B1* | 12/2008 | Nguyen et al. | 709/239 |
| 7,536,464 B1 | 5/2009 | Dommety et al. | |
| 7,944,844 B2 | 5/2011 | Ee et al. | |
| 8,031,627 B2 | 10/2011 | Ee et al. | |
| 8,261,125 B2* | 9/2012 | Wenzel | 714/6.3 |
| 8,331,369 B2 | 12/2012 | Ee et al. | |
| 2002/0027917 A1 | 3/2002 | Sugai et al. | |
| 2002/0031107 A1 | 3/2002 | Li et al. | |
| 2002/0059545 A1 | 5/2002 | Nakashima et al. | |
| 2002/0116491 A1 | 8/2002 | Boyd et al. | |
| 2003/0005148 A1 | 1/2003 | Mochizuki et al. | |
| 2003/0069952 A1 | 4/2003 | Tams et al. | |
| 2003/0081615 A1 | 5/2003 | Kohn et al. | |
| 2003/0088671 A1 | 5/2003 | Klinker et al. | |
| 2003/0115321 A1 | 6/2003 | Edmison et al. | |
| 2003/0147376 A1 | 8/2003 | Coutinho et al. | |
| 2003/0154236 A1 | 8/2003 | Dar et al. | |
| 2003/0177374 A1 | 9/2003 | Yung et al. | |
| 2004/0049714 A1 | 3/2004 | Marples et al. | |
| 2004/0076160 A1 | 4/2004 | Phaltankar | |
| 2004/0095943 A1 | 5/2004 | Korotin | |
| 2004/0170156 A1 | 9/2004 | O'Neill | |
| 2004/0196854 A1 | 10/2004 | Thubert et al. | |
| 2005/0030936 A1 | 2/2005 | Van Den Bosch | |
| 2005/0041675 A1 | 2/2005 | Trostle et al. | |
| 2005/0169270 A1 | 8/2005 | Mutou et al. | |
| 2005/0265308 A1 | 12/2005 | Barbir et al. | |
| 2006/0039385 A1 | 2/2006 | Bare et al. | |
| 2006/0053221 A1 | 3/2006 | Matsui et al. | |
| 2006/0056420 A1 | 3/2006 | Okuda et al. | |
| 2006/0098613 A1 | 5/2006 | Kish et al. | |
| 2006/0120374 A1 | 6/2006 | Yoshimoto et al. | |
| 2006/0159095 A1 | 7/2006 | Cook et al. | |
| 2006/0168246 A1 | 7/2006 | Mochizuki et al. | |
| 2006/0171333 A1 | 8/2006 | Shimada et al. | |
| 2006/0190594 A1 | 8/2006 | Jorgenson et al. | |
| 2006/0221832 A1 | 10/2006 | Muller et al. | |
| 2006/0221990 A1 | 10/2006 | Muller et al. | |
| 2006/0224724 A1 | 10/2006 | Marinescu et al. | |
| 2007/0019657 A1 | 1/2007 | Takayama | |
| 2007/0058491 A1 | 3/2007 | Dahlen et al. | |
| 2007/0195715 A1 | 8/2007 | Yamano et al. | |
| 2008/0013551 A1 | 1/2008 | Scholl | |
| 2008/0016206 A1 | 1/2008 | Ma et al. | |
| 2008/0155093 A1 | 6/2008 | Dharmistan | |
| 2008/0209273 A1 | 8/2008 | Bahl et al. | |
| 2008/0225713 A1 | 9/2008 | Tychon et al. | |
| 2008/0267195 A1 | 10/2008 | Belmon | |
| 2009/0031022 A1 | 1/2009 | Wexler et al. | |
| 2009/0031041 A1 | 1/2009 | Clemmensen | |
| 2009/0196181 A1 | 8/2009 | Retana et al. | |
| 2010/0008233 A1 | 1/2010 | Ee et al. | |
| 2010/0008240 A1 | 1/2010 | Ee et al. | |
| 2010/0008363 A1 | 1/2010 | Ee et al. | |
| 2010/0226251 A1 | 9/2010 | Imai et al. | |
| 2010/0226368 A1* | 9/2010 | Mack-Crane et al. | 370/390 |
| 2011/0142053 A1 | 6/2011 | Van Der Merwe et al. | |
| 2011/0149964 A1 | 6/2011 | Judge et al. | |
| 2011/0286457 A1 | 11/2011 | Ee et al. | |

OTHER PUBLICATIONS

Demers et al., "Analysis and Simulation of a Fair Queueing Algorithm," Applications, Technologies, Architectures, and Protocols for Computer Communication; Symposium Proceedings on Communications Architectures and Protocols, held in Austin, United States, pp. 1-12, 1989 (12 pages).

Bu et al., "On Characterizing BGP Routing Table Growth," Computer Networks: The International Journal of Computer and Telecommunications Networking, vol. 45, Issue 1, May 2004 (5 pages).

Braden et al., "From Protocol Stack to Protocol Heap—Role-Based Architecture," ACM SIGCOMM Computer Communication Review, vol. 33, Issue 1, pp. 17-22, Jan. 2003 (6 pages).

Van Der Merwe et al., "Dynamic Connectivity Management with an Intelligent Route Service Control Point," Applications, Technologies, Architectures, and Protocols for Computer Communication; Proceedings of the 2006 SIGCOMM Workshop on Internet Network Management, held in Pisa, Italy, pp. 29-34, 2006 (6 pages).

Kaplan, Hadriel, "Part 3 in the Reliability Series, NSR Non-Stop Routing Technology," Avici Systems, Inc., 2002 (8 pages).

Cranor et al., "Gigascope: A Stream Database for Network Applications," International Conference on Management of Data; Proceedings of the 2003 ACM SIGMOD International Conference on Management of Data, held in San Diego, United States, pp. 647-651, 2003 (5 pages).

Patterson et al., "A Case for Redundant Arrays of Inexpensive Disks (RAID)," International Conference on Management of Data; Proceedings on the 1988 ACM SIGMOD International Conference on Management of Data, held in Chicago, United States, pp. 109-116, 1988 (8 pages).

Crowcroft et al., "Plutarch: An Argument for Network Pluralism," Mar. 24, 2003 (11 pages).

Castineyra et al., "The Nimrod Routing Architecture," Network Working Group, Aug. 1996 (27 pages).

Moy, J., "OSPF Version 2," Network Working Group, Apr. 1998 (204 pages).

Quittek et al., "Requirements for IP Flow Information Export (IPFIX)," Oct. 2004 (31 pages).

Pan et al., "RFCc4090-Fast Reroute Extensions to RSVP-TE for LSP Tunnels," Network Working Group, May 2005 (29 pages).

Rekhter et al., "A Border Gateway Protocol 4 (BGP-4)," Network Working Group, Jan. 2006 (103 pages).

Andersen et al., "Resilient Overlay Networks," ACM SIGOPS Operating Systems Review, vol. 35, Issue 5, pp. 131-145, Dec. 2001 (15 pages).

Shaikh et al., "OSPF Monitoring: Architecture, Design and Deployment Experience," Proceedings of the 1st Conference on Symposium on Networked Systems Design and Implementation, held in San Francisco, United States, vol. 1, 2004 (14 pages).

Yaar et al., "SIFF: A Stateless Internet Flow Filter to Mitigate DDoS Flooding Attacks," pp. 130-143 of the Proceedings of Security and Privacy of the 2004 IEEE Symposium held on May 9-12, 2004 (14 pages).

Zhao et al., "Tapestry: A Resilient Global-Scale Overlay for Service Deployment," IEEE Journal on Selected Areas in Communications, vol. 22, No. 1, pp. 41-53, Jan. 2004 (13 pages).

Tennenhouse et al., "Towards an Active Network Architecture," pp. 2-15 of DARPA Active Networks Conference and Exposition, proceedings held in San Francisco, United States, on May 29-30, 2002 (14 pages).

Yang et al., "A DoS-limiting Network Architecture," IEEE/ACM Transactions on Networking (TON), vol. 16, Issue 6, pp. 1267-1280, Dec. 2008 (12 pages).

Braden et al., "Developing a Next-Generation Internet Architecture," Jul. 15, 2000 (21 pages).

Stoica et al., "Chord: A Scalable Peer-to-Peer Lookup Protocol for Internet Applications," IEEE/ACM Transactions on Networking (TON), vol. 11, Issue 1, pp. 17-32, Feb. 2003 (14 pages).

(56) References Cited

OTHER PUBLICATIONS

Katabi et al., "Congestion Control for High-Bandwidth-Delay Product Networks," In the Proceedings on ACM SIGCOMM, held in Pittsburgh, United States, on Aug. 19-23, 2002 (14 pages).
Lakshman et al., "The SoftRouter Architecture," Proceedings of the 3$^{rd}$ HotNets SIGCOMM Workshop on Hot Topics in Networks, held in San Diego, United States, on Nov. 15-16, 2004 (6 pages).
Fenner et al., "Protocol Independent Multicast—Sparse Mode (PIM-SM): Protocol Specification (Revised)," RFC 4601, Aug. 2006 (151 pages).
Fenner te al., "Multicast Source Discovery Protocol (MSDP)," RFC 3618, Oct. 2003, (20 pages).
Harrington et al., "An Architecture for Describing Simple Network Management Protocol (SNMP) Management Frameworks," RFC 3411, Dec. 2002 (65 pages).
Meyer et al., "Report from the IAB Workshop on Routing and Addressing," RFC 4984, Sep. 2007 (40 pages).
Rosen et al., "Multiprotocol Label Switching Architecture," RFC 3031, Jan. 2001 (62 pages).
Le Faucheur et al., "Multi-Protocol Label Switching (MPLS) Support of Differentiated Services," RFC 3270, May 2002 (65 pages).
Blake et al., "An Architecture for Differentiated Services," RFC 2475, Dec. 1998 (37 pages).
Andersson et al., "LDP Specification," RFC 3036, Jan. 2001 (133 pages).
"Internet Research Task Force: Routing Research Group," [retrieved from the Internet on Jul. 14, 2010]. Retrieved from the Internet: http://www.irtf.org/charter?gtype=rg&group=rrg, (3 pages).
"Pluris Massively Parallel Routing," Pluris MPR White Paper, [retrieved from the Internet on Jul. 14, 2010]. Retrieved from the Internet: http://www.academ.com/nanog/feb1998/parallel/index.html, Feb. 1998 (12 pages).
Jen et al., "Towards A New Internet Routing Architecture: Arguments for Separating Edges from Transit Core," In Seventh ACM Workshop on Hot Topics in Networks (HotNets-VII), held in Calgery, Alberta, Canada, Oct. 2008 (6 pages).
K. Kobayashi, "Flexible Arrays of Inexpensive Network (FAIN): Toward global parallelism in the Internet to satisfy future traffic growth," In the Proceedings of the 2008 ACM CoNEXT ReArch Workshop, held in Madrid, Spain. Dec. 2008 (6 pages).
Masi et al., "Modeling Internet Service Provider Backbone Networks," Telecommunications Review, pp. 91-103, 2007 (13 pages).
Scheck, Stephen "Net-BGP-0.10," [retrieved from the Internet on Jul. 16, 2010]. Retrieved from the Internet: http://search.cpan.org/~kbrint/Net-BGP-0.10/lib/Net/BGP.pm, (3 pages).
"Configuring Link Bundling on Cisco IOS XR Software," Cisco Systems, Inc., [retrieved from the Internet on Jul. 16, 2010]. Retrieved from the Internet: http://www.cisco.com/en/US/docs/ios_xr_sw/iosxr_r3.2/interfaces/configuration/guide/hc32bund.html, (9 pages).
"Cisco Integrated Routing and Bridging," Cisco Systems, Inc., [retrieved from the Internet on Jul. 16, 2010]. Retrieved from the Internet: http://www.cicso.com/en/US/tech/tk389/tk855/tsd_technology_support_sub-protocol_home.html, (1 page).
"TX Matrix—Central Switching and Routing Element," Juniper Networks, [retrieved from the Internet on: Jul. 16, 2010]. Retrieved from the Internet: http://www.juniper.net/us/en/products-services/routing/t-tx-series/txmatrix/, (1 page).
"Cisco CRS-1 Multishelf System," Cisco Systems, Inc., [retrieved from the Internet on: Jul. 16, 2010]. Retrieved from the Internet: http://www.cisco.com/en/US/products/ps5842/index.html, (1 page).
"The OpenFlow Switch Consortium," [retrieved from the Internet on: Jul. 16, 2010]. Retrieved from the Internet: http://www.openflowswitch.org, (2 pages).
"The BGP Instability Report," [retrieved from the Internet on: Jul. 16, 2010]. Retrieved from the Internet: http://bgpupdates.potaroo.net/instability/bgpupd.html, (5 pages).
Labovitz et al., "Experimental Study of Internet Stability and Wide-Area Backbone Failures," In Proc. International Symposium on Fault-Tolerant Computing, 1998 (22 pages).
"The Netfilter Project," [retrieved from the Internet on: Jul. 16, 2010]. Retrieved from the Internet: http://www.netfilter.org/, (2 pages).
"Avici Composite Links," Avici Systems, [retrieved from the Internet on: Jul. 16, 2010]. Retrieved from the Internet: http://63.111.106.66/technology/composite_links.shtml, (1 page).
"Cisco Visual Networking Index," Cisco Systems, Inc., [retrieved from the Internet on: Jul. 16, 2010]. Retrieved from the Internet: http://www.cisco.com/visualnetworkindex, (15 pages).
Farinacci et al., "Locator/ID Separation Protocol (LISP)," Internet Draft draft-farinacci-lisp-11.txt, Dec. 19, 2008 (58 pages).
Ballani et al., "ViAggre: Making Routers Last Longer!," In NSDI'09: Proceedings of the 6$^{th}$ Conference on Symposium on Networked Systems Design & Implementation, USENIX Association, 2009 (6 pages).
Aggarwal et al., "MPLS Upstream Label Assignment and Context-Specific Label Space," Internet Draft draft-ietf-mpls-upstream-label-07.txt, Jul. 10, 2008 (13 pages).
Eatherton et al., "Tree Bitmap : Hardware/Software IP Lookups with Incremental Updates," ACM SIGCOMM Computer Communications Review vol. 34, No. 2, pp. 97-122, Apr. 2004 (26 pages).
Feamster et at., "Detecting BGP Configuration Faults with Static Analysis," In NSDI'05: Proceedings of the Symposium on Networked Systems Design and Implementation, May 2-4, 2005, Boston, MA, May 2005 (23 pages).
Mahajan et al., "Understanding BGP Misconfiguration," SIGCOMM'02, Aug. 19-23, 2002, Pittsburgh, Pennsylvania, (14 pages).
Zhang et al., "Scaling IP Routing with the Core Router-Integrated Overlay," In ICNP'06: Proceedings of the 2006 IEEE International Conference on Network Protocols, pp. 147-156, Washington, DC, 2006 (10 pages).
Bernaschi et al., "SockMi: a solution for migrating TCP/IP connections," In 15th EUROMICRO International Conference on Parallel, Distributed and Network-Based Processing, Feb. 2007 (5 pages).
Hagsand et al., "Design and Implementation of a Distributed Router," In 2005 IEEE International Symposium on Signal Processing and Information Technology, pp. 227-232, Dec. 2005 (6 pages).
"Virtual Bridged Local Area Networks," IEEE Standard for Local and metropolitan area networks, IEEE Std 802.1Q-2005, 2005 (303 pages).
United States Non-Final Office Action, issued by the United States Patent Office in connection with U.S. Appl. No. 12/343,707, on Jul. 22, 2010, 23 pages.
United States Non-Final Office Action, issued by the United States Patent Office in connection with U.S. Appl. No. 12/343,719, on Apr. 1, 2010, 24 pages.
United States Non-Final Office Action, issued by the United States Patent Office in connection with U.S. Appl. No. 12/343,735, on Aug. 19, 2010, 21 pages.
United States Final Office Action, issued by the United States Patent Office in connection with U.S. Appl. No. 12/343,719, on Sep. 14, 2010, 25 pages.
USPTO, "Notice of Allowance," issued in connection with U.S. Appl. No. 12/343,707, dated Apr. 28, 2011 (7 pages).
USPTO, "Notice of Allowance," issued in connection with U.S. Appl. No. 12/343,735, dated Feb. 11, 2011 (9 pages).
USPTO, "Office Action," issued in connection with U.S. Appl. No. 12/343,719, dated Apr. 14, 2011 (26 pages).
USPTO, "Final Office Action," issued in connection with U.S. Appl. No. 12/343,719, dated Nov. 16, 2011 (28 pages).
USPTO, "Notice of Allowance," issued in connection with U.S. Appl. No. 12/343,719, dated Aug. 13, 2012 (9 pages).
USPTO, "Office Action," issued in connection with U.S. Appl. No. 12/786,162, dated Feb. 14, 2012 (14 pages).
USPTO, "Final Office Action," issued in connection with U.S. Appl. No. 12/786,162, dated Jan. 31, 2013 (18 pages).
Final Office Action, issued by the United States Patent and Trademark Office in connection with U.S. Appl. No. 12/343,707, on Jan. 21, 2011, 24 pages.
Non-final Office Action, issued by the United States Patent and Trademark Office in connection with U.S. Appl. No. 13/691,167, on Apr. 24, 2013, 38 pages.
United States Patent and Trademark Office, "Notice of Allowance," issued in connection with U.S. Appl. No. 13/691,167 on Nov. 7, 2013, 17 pages.
United States Patent and Trademark Office, "Office Action," issued in connection with U.S. Appl. No. 12/786,162 on Jan. 14, 2014, 15 pages.

* cited by examiner

METHODS AND APPARATUS TO ROUTE PACKETS IN A NETWORK

FIELD OF THE DISCLOSURE

This disclosure relates generally to routing and, more particularly, to methods and apparatus to route packets in a network.

BACKGROUND

The Internet is composed of an underlying infrastructure and communication protocols operating in conjunction with the infrastructure. The infrastructure can be viewed as a network topology combining links and routers, while the protocols are meta-communication algorithms that facilitate efficient usage of the infrastructure. Protocols may include Internet Protocol (IP), Open Shortest Path First (OPSF), Simple Network Management Protocol (SNMP), Border Gateway Protocol (BGP), Transmission Control Protocol (TCP), and/or Multiprotocol Label Switching (MPLS).

Traditionally, Internet development has focused on the evolution, creation, and/or improvement of the protocols while the infrastructure has received relatively less attention. Because the performance of the infrastructure and the protocols affect each other, neglect of the infrastructure may cause issues to manifest within the protocols. For example, rapid growth in address prefixes associated with the IP version four (IPv4) protocol has created an issue where routing entities (e.g., infrastructure components) are running out of forwarding memory. Currently, solutions to this issue focus on protocol improvements and/or changes to routers.

DETAILED DESCRIPTION

Example methods, articles of manufacture, and apparatus to route packets in a network are disclosed. A disclosed example method includes receiving a packet in a packet aggregator, accessing a forwarding table to determine a router within a router array to which the packet is to be forwarded, and transmitting the packet to the determined router via a first interface of the packet aggregator. The example method further includes identifying a second interface within the router to which the packet is to be forwarded, forwarding the packet from the router via the second interface to a virtual interface within the packet aggregator, and statically forwarding the packet from the packet aggregator to a destination based on the virtual interface that received the packet.

A disclosed example apparatus includes a packet aggregator to access a forwarding table to determine a location within a router array to which the packet is to be forwarded, transmit the packet via a first interface, and statically forward the packet to a destination based on a virtual interface that received the packet from the location. The example apparatus also includes a router to receive the packet from the packet aggregator, identify a second interface within the router to which the packet is to be forwarded, and forward the packet via the second interface to a virtual interface of the packet aggregator.

Currently, a packet communication network (e.g., the Internet) provides connectivity between users and/or enterprises. A relatively small number of users may be communicatively coupled together via a switching device (e.g., a router). However, as the number of users and/or enterprises increases, the switching device may experience capacity issues. These capacity issues may include an availability of interfaces or ports, an end-to-end latency increase of packets propagating through the switching device, an increase in forwarding table size, and/or increases in recovery times due to temporary unavailability of the switch.

To resolve the issues of a single switch, multiple switches and/or routers at different physical locations may be combined together in a routing network configuration. In this configuration, adjacent routers and/or switches are directly communicatively coupled together. Further, each router and/or switch may directly couple to a subset of users and/or enterprises. In addition to this infrastructure solution, communication protocols are typically implemented to optimize routing paths and reduce latency with the routing network. In this routing network configuration, end-to-end latency may be minimized based on a routing protocol but processing delays may result from packets propagating through multiple routers (e.g., the infrastructure) to reach a destination. Further, the communication protocols may provide relatively quicker network recovery from temporary outages of one or more routers because the interconnectivity of the network topology facilities re-routing packets around a router and/or link experiencing an issue.

However, quicker recovery times have a tradeoff of an increase in network management and complexity. In addition, communication protocols have become more complex to manage and optimize the routing network. Furthermore, with many different users and routers within the network, forwarding table sizes may be relatively large to accommodate the many routers, users, and/or enterprises. Additionally, forwarding table sizes have increased with the frequent use of multihoming to route packets.

The example methods, articles of manufacture, and apparatus described herein provide scalability of a communication network by implementing a TIF router. A TIF router may be implemented for a region (e.g., New York City, Chicago, Western Pennsylvania, etc.) to manage packet forwarding and/or routing for that region. In other examples, a TIF router may be implemented throughout an entire network (e.g., the United States). The example TIF router enables scalability of a communication network by using a logical switch and/or router to eliminate the complexity of managing a routing network with many routers at different locations. The logical switch includes multiple physical switches (e.g., routers), where any physical switch may take over a state (e.g., address subspace) of any other switch within the logical switch. Furthermore, interfaces and forwarding tables (independent of a network communication protocol) may be distributed among the physical switches and/or routers enabling relatively better scalability than a routing network. By distributing forwarding tables among the physical routers such that each physical router is partitioned into a subspace or a portion of the entire address space, the forwarding table size stored at each router is reduced.

Additionally, distributing forwarding tables may enable features and/or functionality to be distributed among the physical routers within a TIF router. Features and/or functionality may include Open Shortest Path First (OSPF) protocol, Border Gateway Protocol (BGP), Multiprotocol Label Switching (MPLS), multicast, access-control lists, rate policing, Virtual Private Networks (VPNs), and/or Internet Protcol version 6 (IPv6). The features and/or functionality may be distributed among physical routers within the TIF router based on partitioned address subspaces assigned to each physical router. Distributing features among physical routers within the TIF router may improve reliability. For example, if a physical router experiences an issue, other physical routers with the same feature may provide that feature.

In some examples, the example TIF router may be implemented at a regional level while a routing network is utilized at a relatively higher level closer to a network core. In this example, the TIF router functions as a logical router with an array of physical switches and/or routers performing wide-area routing of packets. Each physical router and/or switch within the logical TIF router may be assigned a separate address subspace such that each router and/or switch is responsible for routing a portion of received traffic. Further, the physical routers may be organized into a router array.

The example TIF router may include a packet aggregator that receives packets and includes virtual interfaces that couple the packet aggregator to each of the physical routers. The example packet aggregator may determine to which physical router each packet is to be routed based on a destination of the packet. The corresponding physical router may then perform data plane operations on the packet to select an outgoing interface that corresponds to a next-hop and/or a destination of the packet. The physical router may then transmit the packet through the interface to the packet aggregator, which then statically forwards the packet to the destination and/or next-hop router. In this manner, the example methods, apparatus, and articles of manufacturer described herein may effectively and efficiently route traffic at a regional level via the physical router array while minimizing forwarding table sizes of each physical router.

In the interest of brevity and clarity, throughout the following disclosure, reference will be made to an example communication system 100 of FIG. 1. However, the example methods, articles of manufacture, and apparatus described herein to route packets in a network are applicable to other types of networks constructed using other network technologies, topologies and/or protocols. Protocols may include Internet Protocol (IP), OSPF, Simple Network Management Protocol (SNMP), BGP, Transmission Control Protocol (TCP), and/or MPLS.

Figure 1:
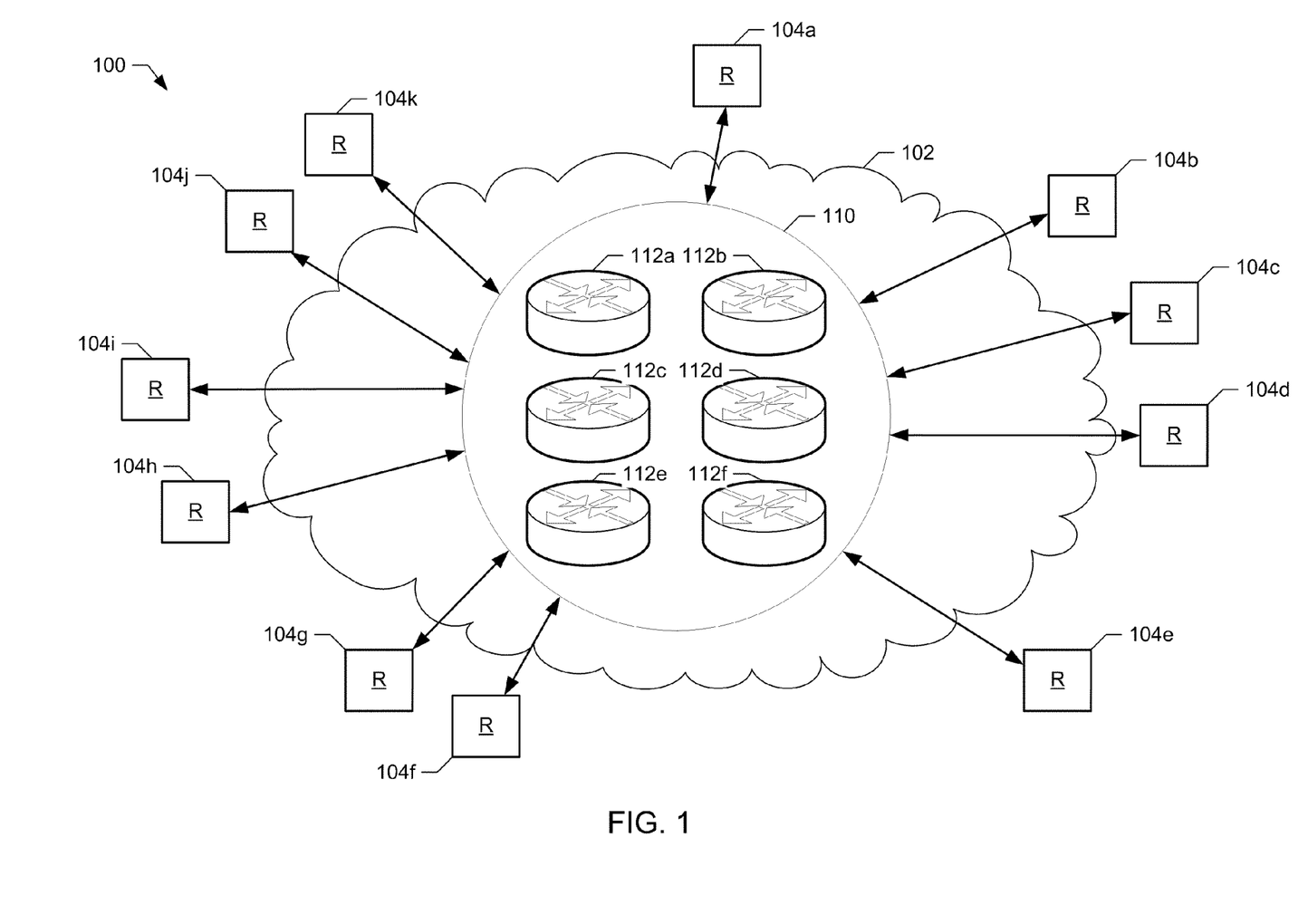
FIG. 1 is a schematic illustration of an example communication system including an example a topology-independent forwarding (TIF) router.

FIG. 1 illustrates the example communication system 100 implemented in connection with a switching network 102 (e.g., the Internet). The example switching network 102 may include any type of network for routing packet-based communications (e.g., data). The switching network 102 may be implemented by any type of public switched telephone network (PSTN) system(s), public land-mobile network (PLMN) system(s), wireless distribution system(s), wired or cable distribution system(s), coaxial cable distribution system(s), fiber-to-the-home network(s), fiber-to-the-curb network(s), fiber-to-the-pedestal network(s), fiber-to-the-vault network(s), fiber-to-the-neighborhood network(s), Ultra High Frequency (UHF)/Very High Frequency (VHF) radio frequency system(s), satellite or other extra-terrestrial system(s), cellular distribution system(s), power-line broadcast system(s), and/or combinations and/or hybrids of these devices, systems and/or networks.

The example switching network 102 is communicatively coupled to external routers 104a-k that may be included within other switching networks and/or associated with users and/or enterprises (e.g., clients). The example external routers 104a-k may be packet-based switches such as, for example, the Catalyst 3000 and/or 5000 series of switches from Cisco Systems, Inc. Some of the external routers 104a-k may communicatively couple the example switching network 102 to other switching networks and/or to users. Additionally, the example external routers 104a-k may be communicatively coupled to a gateway (e.g., a modem) providing a network interface for customer premises equipment (e.g., a computer, a Voice over IP (VoIP) phone, a laptop, etc.).

To route packets from the external routers 104a-k, the example switching network 102 includes a TIF router 110. The example TIF router 110 provides packet routing for regions including relatively small regions (e.g., tens of square miles) to relatively large regions (e.g., a few hundred square miles). In other examples, the TIF router 110 may provide routing for an entire Internet Service Provider and be coupled to hundreds of external routers.

The external routers 104a-k of FIG. 1 may be communicatively coupled to the logical TIF router 110 via any wired and/or wireless communication medium (e.g., a Wide Area Network (WAN), a Local Area Network (LAN), a VPN, a Virtual LAN (VLAN), Wireless LAN (WLAN) network, etc.). In other examples, the communication system 100 may include fewer or more external routers 104a-k communicatively coupled to the TIF router 110.

The example TIF router 110 is a logical router that includes an array of physical routers 112a-f. In other examples, the TIF router 110 may include fewer or more physical routers. The physical routers 112a-f are organized within the TIF router 110 so that each physical router 112a-f is assigned an address subspace for routing packets. For example, the TIF router 110 may be responsible for routing packets among the external routers 104a-k. In this example, the physical router 112a may be assigned an address subspace that corresponds to the external routers 104a-c. Thus, packets and/or traffic with a header that specifies a destination that is reachable via the external routers 104a-c are directed by the TIF router 110 to the physical router 112a. The physical router 112a may then access a forwarding table to determine an appropriate interface so that packets and/or traffic are routed to the external routers 104a-c.

By partitioning destination address subspace among the physical routers 112a-f, the forwarding tables within the physical routers 112a-f may include fewer entries. Fewer entries in a forwarding table results in less memory for packet routing by the physical routers 112a-f. In some examples, the TIF router 110 may manage the address subspace assigned to the physical routers 112a-f so that the address subspace assigned to each physical router 112a-f may be adjusted based on load, redundancy, and/or fault protections. Because the physical routers 112*a-f* are located at the same physical location within the TIF router 110, network management and failsafe backup operations may be performed relative quickly and efficiently. To enable the logical TIF router 110 to adjust address subspace among the physical routers 112*a-f*, a layer of link-level virtualization is implemented by packet aggregators so that the TIF router 110 may link to the physical routers 112*a-f* via virtual interfaces that may be adjusted based on traffic and/or router conditions.

For example, if the physical router 112*b* experiences an issue and cannot route packets for a time period, the example TIF router 110 may partition the address subspace associated with the router 112*b* among the other routers 112*a* and 112*c-f*. The TIF router 110 may also redefine a virtual interface associated with the router 112*b* so that packets are routed to the other routers 112*a* and 112*c-f*. The TIF router 110 may then continue to route packets without a noticeable effect in packet latency. Thus, the TIF router 110 provides failsafe redundancy in instances where one or more routers experience an issue.

The example TIF router 110 may be deployed within a regional network that communicatively couples users to a network core of the communication system 100. A network core provides routing of traffic across larger areas. For example, the external routers 104*a-e* may be associated with a network core and the external routers 104*f-k* may be associated with users. In this example, the TIF router 110 functions as an aggregator by receiving traffic from the external routers 104*f-k* and funneling the traffic into the array of physical routers 112*a-f*. The physical routers 112*a-f* determine to which interface of the TIF router 110 to transmit the traffic so that the traffic may be routed to a destination via the appropriate external routers 104*a-e* within the network core. In some examples, the TIF router 110 may include multiple aggregators to receive and funnel the traffic into a single aggregator that is communicatively coupled to the physical routers 112*a-f*. In other examples, an aggregator may receive traffic from users and/or enterprises within a region and forward the traffic to the appropriate physical router 112*a-f* within the array. In a similar manner, traffic received by an aggregator within the TIF router 110 from a network core may be routed by the physical routers 112*a-f* and forwarded via an interface within the TIF router 110 to reach the appropriate regional and/or local destination.

Figure 2:
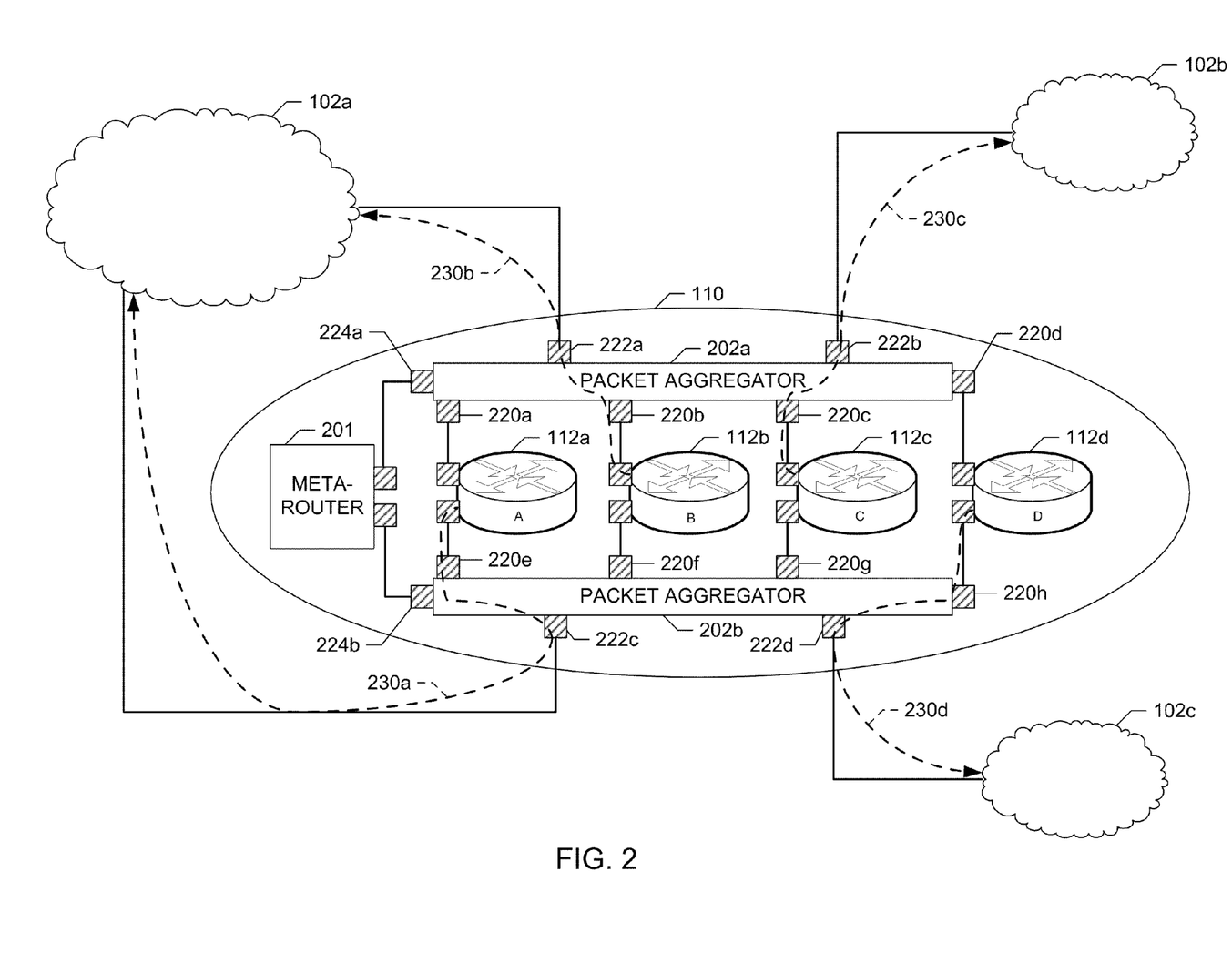
FIG. 2 illustrates an example manner of implementing the example TIF router of FIG. 1.

FIG. 2 illustrates an example manner of implementing the example TIF router 110 of FIG. 1. The example TIF router 110 is communicatively coupled to switching networks 102*a-c* that may be similar to the switching network 102 of FIG. 1. The example TIF router 110 also includes the physical routers 112*a-d* of FIG. 1. For brevity, the physical routers 112*e-f* are not shown in FIG. 2. The physical routers 112*a-d* may each be associated with a different address subspace based on the most significant n-bits of an address. For example, the physical router 112*a* may be assigned an address subspace associated with the prefix 2.1.0.0/16. Thus, any traffic received by the TIF router 110 with a prefix of 2.1.0.0/16 may be forwarded to the router 112*a* for routing. By partitioning an address space (and/or features) to the routers 112*a-d*, control and data plane loads are distributed, thereby reducing forwarding table sizes at each router 112*a-d*.

To manage the distribution of the address space and/or features among the routers 112*a-d* and the associated control plane, the example TIF router 110 includes a meta-router 201. In this example, control messages and/or packets received by the TIF router 110 are sent to the meta-router 201. Upon receiving a control message, the meta-router 201 parses the message to determine specified destination prefixes. The example meta-router 201 then forwards the control message to the router 112*a-d* that manages the address subspace corresponding to the prefix specified within the control message. Upon receiving the control message, the physical routers 112*a-d* may update, add, remove, etc. entries associated with the address subspace stored in the respective forwarding table based on information within the control message.

The example meta-router 201 may also store a copy of control messages, which enables the meta-router 201 to transmit the control messages to a different router 112*a-d* to recreate a corresponding routing state during instances of hot-standby and/or failure recovery. In this manner, the meta-router 201 enables substantially continuous routing when a physical router (e.g., the routers 112*a-d*) experiences an issue.

To aggregate, queue, and/or distribute data packets to the physical routers 112*a-d*, the example TIF router 110 of FIG. 2 includes packet aggregators 202*a-b*. In some examples, the example packet aggregators 202*a-b* may be similar to layer-2 switches. The packet aggregators 202*a-b* are responsible for link-level virtualization that enables the meta-router 201 to manage redundancy and recovery among the physical routers 112*a-d*. The example packet aggregators 202*a-b* may queue data packets with headers that specify a similar destination and/or source in instances where the physical routers 112*a-d* are relatively higher throughput devices.

In the example of FIG. 2, the aggregators 202*a-b* are connected to each of the physical routers 112*a-d*, via virtual interfaces 220*a-h* providing reachability to destination prefixes within the routers 112*a-d*. In some examples, two or more virtual interfaces 220*a-h* corresponding to the same prefixes may exist for the different routers 112*a-d* because addresses reachable via a single virtual interface may reside in different address blocks, which may be managed by different routers 112*a-d*. Additionally or alternatively, two or more virtual interfaces 220*a-h* corresponding to the same prefixes may exist for the different routers 112*a-d* because additional virtual interfaces may be provisioned and/or designated as hot-standbys to reduce recovery times.

The example packet aggregators 202*a-b* also distribute data packets among the routers 112*a-d* and forward control packets to the meta-router 201. Each incoming packet is received by the packet aggregators 202*a-b* via respective ports 222*a-d* (e.g., interfaces). The packet aggregators 202*a-b* then route the incoming packets to a corresponding router 112*a-d* and/or 201 based on a destination address within the packet. Using the example TIF router 110 configuration, the packet aggregators 202*a-b* may perform standard lookup via a forwarding table to determine the appropriate router 112*a-d* and/or 201. However, the size of the forwarding table may be significantly smaller than a typical router because the forwarding tables accessed by the packet aggregators 202*a-b* only reference address prefixes organized by the subspaces associated with each of the routers 112*a-d*. In other examples, the packet aggregators 202*a-b* may route packets among two or more physical routers 112*a-d*. In other words, any combination of the physical routers 112*a-d* may be utilized by the packet aggregators 202*a-b* to route packets. The packet aggregators 202*a-b* may use more than one of the physical router 112*a-d* to compensate for relatively congested traffic conditions and/or for hierarchical routing of relatively large address spaces.

Upon determining the physical router 112*a-d* to which a data packet is to be forwarded, the packet aggregators 202*a-b* identify a virtual interface (e.g., the virtual interfaces 220*a-h*) to forward the data packet to the router 112*a-d*. The virtual interface may be determined by a corresponding incoming interface of the packet aggregators 202a-b. Further, other data packets determined to undergo further lookup at the same physical router 112a-d are forwarded by the packet aggregators 202a-b to the same virtual interface. Thus, each of the physical routers 112a-d maintains virtual interfaces with the packet aggregators 202a-b for an associated address subspace and maintains a virtual interface for incoming packets. Additionally, because address subspace of the routers 112a-d is associated with the virtual interfaces 220a-h of the packet aggregators 202a-b, the number of interfaces between each of the routers 112a-d and the packet aggregators 202a-b can be reduced. In other words, the example TIF router 110 provides a framework for instantiating virtual interfaces corresponding to specific destination addresses only at the routers 112a-d that are specified to handle the specific destination addresses.

For example, the physical router 112a is communicatively coupled to the packet aggregator 202a via the virtual interface 220a and is communicatively coupled to the packet aggregator 202b via the virtual interface 220e. Further, the physical router 112a includes a port 224a for receiving data packets from the packet aggregator 202a and a port 224b for receiving data packets from the packet aggregator 202b. Additionally or alternatively, upon performing data plane operations on a received data packet, the physical router 112a may route the data packet out of the TIF router 110 by determining an outgoing interface (e.g., the ports 224a-b). For example, transmitting a data packet to the packet aggregator 202a via the port 224a and the virtual interface 220a may cause the packet aggregator 202a to statically forward the data packet to the switch network 102a via the port 222a. For brevity, only two ports are shown for the physical routers 112a-d. In other examples, the physical routers 112a-d may include additional ports and/or virtual interfaces communicatively coupled to the packet aggregators 202a-b.

The example physical routers 112a-d perform data plane operations on data packets including accessing a forwarding table and determining an outgoing virtual interface from the routers 112a-d to the packet aggregators 202a-b. Each of the physical routers 112a-d includes a forwarding table with entries associated with a subspace of an address space. The physical routers 112a-d may also be associated with features and/or functionality. Upon receiving a routed data packet from the routers 112a-d, the packet aggregators 202a-b statically forward the data packet via an appropriate outgoing interface. By statically forwarding data packets arriving from an interface of a router to an appropriate outgoing interface at the aggregators 202a-b, the TIF router 110 ensures that routing decisions made by the routers 112a-d become the routing decision of the TIF router 110.

The example of FIG. 2 shows static forwarding by the packet aggregators 202a-b. In particular, the physical router 112a is shown routing a data packet via a communication path 230a to the switching network 102. The communication path 230a includes the port 224b, the virtual interface 220e and the port 222c within the packet aggregator 202b. In this example, the packet aggregator 202b may be configured so that any data packets received via the virtual interface 220e are statically forwarded to a router and/or destination within the switching network 102a via the port 222c. Likewise, the physical router 112b may determine that a data packet is to be routed to the switching network 102a via a communication path 230b. Upon receiving the data packet from the physical router 112b via the virtual interface 220b, the packet aggregator 202a may statically forward the packet to the switching network 102a via the port 222a. Similarly, the router 112c may determine that a data packet is to be routed to the switching network 102b via a communication path 230c. The packet aggregator 202a statically forwards the data packet received via the virtual interface 220c to the switching network via the port 222b. Additionally, the router 112d may determine that a data packet is to be routed to the switching network 102c via a communication path 230d. The packet aggregator 202b statically forwards the data packet received via the virtual interface 220h to the switching network via the port 222d.

To create the address subspace assigned to the physical routers 112a-d, the example TIF router 110 of FIG. 2 distributes forwarding tables (e.g., Internet routing tables) among the routers 112a-d in a router array. Thus, having the four routers 112a-d within the array may result in a forwarding table size at each of the routers 112a-d being approximately one-fourth of the size of a forwarding table utilized by a router within a routing network. Further, the expected number of forwarding lookups along a communication path of a packet is decreased compared to a routing network because the example TIF router 110 only performs one data plane lookup for a data packet via the routers 112a-d. This flattening of routing hierarchy may reduce the amount of router forwarding capacity required. Additionally, by gathering the routers 112a-d into the example TIF router 110, the number of routers in a regional area is effectively reduced to the single TIF router 110, thereby improving scalability of the control plane. Moreover, by having a single TIF router 110, BGP, route reflectors, and/or access router operation may be simplified. Also, the example TIF router 110 utilizes communication paths between the routers 112a-d, the packet aggregators 202a-b, and/or the switching networks 102a-c that may be high-capacity and fewer in number. Thus, virtual interfaces (e.g., the virtual interfaces 220a-h) may be instantiated on the routers 112a-d without incurring significant overhead.

While an example manner of implementing the TIF router 110 is depicted in FIG. 2, one or more of the interfaces, data structures, elements, processes and/or devices illustrated in FIG. 2 may be combined, divided, rearranged, omitted, eliminated and/or implemented in any other way. For example, the example meta-router 201, the example packet aggregators 202a-b, and/or the example physical routers 112a-d illustrated in FIG. 2 may be implemented separately and/or in any combination using, for example, machine-accessible or readable instructions executed by one or more computing devices and/or computing platforms (e.g., the example processing platform P100 of FIG. 9).

Further, the example meta-router 201, the example packet aggregators 202a-b, the example physical routers 112a-d and/or, more generally, the example TIF router 110 may be implemented by hardware, software, firmware and/or any combination of hardware, software and/or firmware. Thus, for example, any of the example meta-router 201, the example packet aggregators 202a-b, the example physical routers 112a-d and/or, more generally, the example TIF router 110 can be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus claims are read to cover a purely software implementation, at least one of the example meta-router 201, the example packet aggregators 202a-b, and/or the example physical routers 112a-d are hereby expressly defined to include a tangible medium such as a memory, DVD, CD, etc. Further still, the example TIF router 110 of FIG. 2 may include one or more elements, processes and/or devices in addition to, or instead of, those illustrated in FIG. 2, and/or may include more than one of any or all of the illustrated elements, processes and devices.

Figure 3:
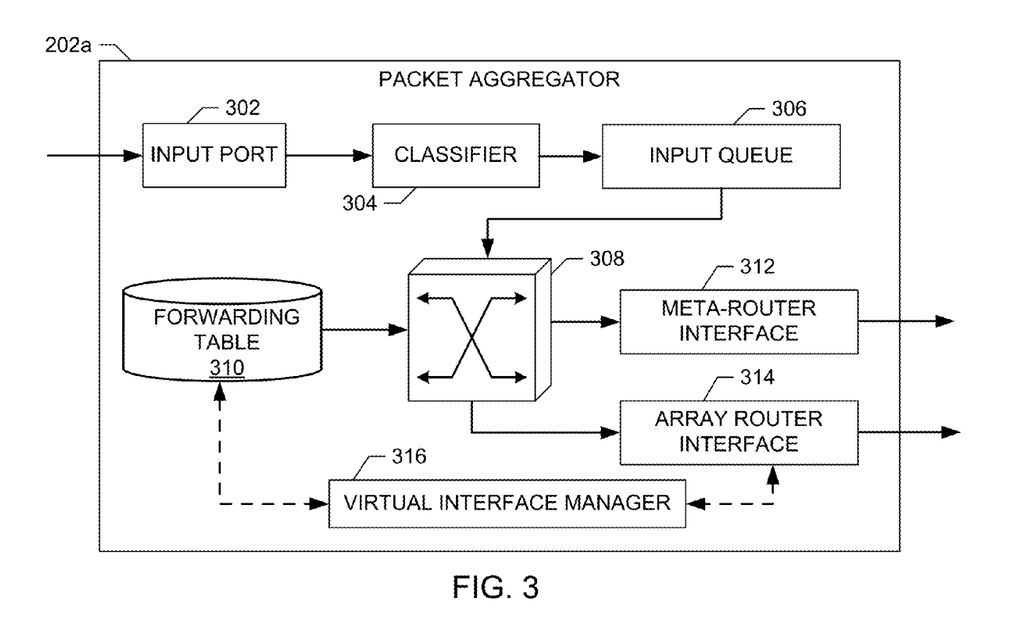
FIG. 3 illustrates a functional block diagram of an example packet aggregator that may be included within the TIF router of FIGS. 1 and/or 2.

FIG. 3 illustrates a functional block diagram of the example packet aggregator 102a that may be included within the TIF router 110 of FIGS. 1 and/or 2. While FIG. 3 shows a functional block diagram of the packet aggregator 202a, the block diagram may be representative of the packet aggregator 202b and/or other packet aggregators. To receive packets and/or traffic from an external router and/or a source, the example packet aggregator 202a includes an input port 302. The example input port 302 may be similar to the ports 222a-b of FIG. 2. The example input port 302 may include a configurable interface that functions as a receiver for the TIF router 110.

To identify packet types and/or types of traffic received by the input port 302, the example packet aggregator 202a includes a classifier 304. The example classifier 304 determines if a packet and/or traffic is a control packet or a data packet by either determining a destination address within a header of the packet or determining a type of packet based on information within a body of the packet. For example, a control packet may have a destination address corresponding to the meta-router 201 while a data packet may have a destination address corresponding to a user location and/or one of the physical routers 112a-d. Additionally or alternatively, a control packet may include information that specifies a change to a control plane (e.g., a change to entries in a forwarding table) for the packet aggregator 202a and/or the physical routers 112a-d while a data packet may include information associated with an application and/or data transfer from a user to another user.

If the example classifier 304 determines that a packet is a control packet, the classifier 304 may label the packet as a control packet and/or instruct that the packet be forwarded to the meta-router 201. However, if the classifier 304 determines that a packet is a data packet, the classifier 304 may label the packet as a data packet and/or instruct that a forwarding table be accessed to determine a physical router within a router array to which the data packet is to be forwarded.

To aggregate and/or queue packets, the example packet aggregator 202a of FIG. 3 includes an input queue 306. While the example input queue 306 is shown communicatively coupled to the classifier 304, in other examples, the input queue 306 may be located at an outgoing interface of the packet aggregator 202a. In yet other examples, the packet aggregator 202a may include multiple input queues to aggregate packets during different stages of processing.

The example input queue 306 may be implemented within the packet aggregator 202a in instances where the TIF router 110 processes and/or is configured for a relatively large throughput of traffic and/or packets. By queuing packets, the example input queue 306 accumulates packets with the same destination and forwards the packets for routing as a group so that a router (e.g., the physical routers 112a-d) may only have to access a forwarding table entry for the group of aggregated packets. The example input queue 306 queues similar packets until a threshold is reached. Similar packets may include packets with the same source address and/or packets with the same destination address. In other examples, similar packets may include packets with a similar next-hop address. When a threshold is reached, the example input queue 306 forwards the aggregated packets for routing. The threshold may include a time threshold (e.g., similar packets received every 100 milliseconds) and/or a quantity threshold (e.g., 100 similar packets).

To route packets and/or traffic to the appropriate physical router (e.g., the physical routers 112a-d) and/or the meta-router 201, the example packet aggregator 202a of FIG. 3 includes a switch fabric 308. Upon receiving packet(s) from the input queue 306, the example switch fabric 308 accesses a forwarding table 310 to identify a router and/or an interface to transmit the packet(s). The example forwarding table 310 includes entries that partition an address space and/or features into subspaces that are assigned to physical routers (e.g., the physical routers 112a-d). The forwarding table 310 may be implemented by Electronically Erasable Programmable Read-Only Memory (EEPROM), Random Access Memory (RAM), Read-Only Memory (ROM), and/or any other type of memory.

The example switch fabric 308 may also receive instructions from the classifier 304 as to which packets are control packets and which packets are data packets. The switch fabric 308 may then route packets labeled as control packets to a meta-router interface 312 and route packets classified as data packets to an array router interface 314. Additionally, the switch fabric 308 may also identify an outgoing interface based on an incoming interface (e.g., the input port 302) of a packet. The example meta-router interface 312 is communicatively coupled to the meta-router 201 so that any packet transmitted to the meta-router interface 312 is forwarded to the meta-router 201. Similarly, the example array router interface 314 may include one or more virtual interfaces (e.g., the virtual interfaces 220a-d of FIG. 2) that the switch fabric 308 may access to transmit data packets to the appropriate physical router 112a-d.

For example, the switch fabric 308 may receive packets from the input queue 306. The switch fabric 308 identifies a destination address within a header of the packet and accesses the forwarding table 310 to determine the physical router 112a-d and/or the virtual interface to route the packet. In some examples, an entry in the forwarding table 310 may include a virtual interface that cross-references to an address subspace of a physical router. In other examples, a forwarding table entry may include a physical router identifier with a list of virtual interfaces corresponding to different destination address subspaces. Upon matching a prefix of the destination address of the packet to a physical router and/or a virtual interface, the example switch fabric 308 accesses the array router interface 314 and locates the appropriate virtual interface. The switch fabric 308 then transmits the packet to the router via the virtual interface. Alternatively, if the switch fabric 308 matches a destination address of a packet to the meta-router 201, the switch fabric 308 accesses the meta-router interface 312 to forward the packet to the meta-router 201.

To manage entries within the forwarding table 310 and the virtual interfaces within the array router interface 314, the example packet aggregator 202a of FIG. 3 includes a virtual interface manager 316. The example virtual interface manager 316 may update entries within the forwarding table 310 in instances when a physical router experiences an issue. Issues may include maintenance, hot-standby conditions, link issues, router line card issues, switch issues, etc. The virtual interface manager 316 may receive a message from the affected physical router and/or may monitor the status of the physical routers 112a-d for issues. Upon detecting an issue that affects routing (e.g., an inoperable router), the example virtual interface manager 316 updates the forwarding table 310 by combining the address subspace associated with the affected router with the address subspace of the other routers. Reassigning the address subspace of the affected router ensures that packets may be routed by an operable physical router.

Additionally, the virtual interface manager 316 may update forwarding tables within the routers assigned a portion of the address subspace of the affected router so that these routers may perform data plane operations on data packets to ensure the data packets are routed to the appropriate destination. Further, the virtual interface manager 316 may modify the virtual interfaces within the array router interface 314 by disabling virtual interfaces associated with the affected physical router and enabling virtual interfaces to the reassigned routers. Enabling virtual interfaces associated with the reassigned routers provides sufficient bandwidth and/or routing capacity so that the reassigned physical routers may receive additional packets without adding routing latency into the TIF router 110.

While an example manner of implementing the packet aggregator 102a is depicted in FIG. 3, one or more of the interfaces, data structures, elements, processes and/or devices illustrated in FIG. 3 may be combined, divided, rearranged, omitted, eliminated and/or implemented in any other way. For example, the example input port 302, the example classifier 304, the example input queue 306, the example switch fabric 308, the example forwarding table 310, the example meta-router interface 312, the example array router interface 314, and/or the example virtual interface manager 316 illustrated in FIG. 3 may be implemented separately and/or in any combination using, for example, machine-accessible or readable instructions executed by one or more computing devices and/or computing platforms (e.g., the example processing platform P100 of FIG. 9).

Further, the example input port 302, the example classifier 304, the example input queue 306, the example switch fabric 308, the example forwarding table 310, the example meta-router interface 312, the example array router interface 314, the example virtual interface manager 316 and/or, more generally, the example packet aggregator 102a may be implemented by hardware, software, firmware and/or any combination of hardware, software and/or firmware. Thus, for example, any of the example input port 302, the example classifier 304, the example input queue 306, the example switch fabric 308, the example forwarding table 310, the example meta-router interface 312, the example array router interface 314, the example virtual interface manager 316 and/or, more generally, the example packet aggregator 102a can be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus claims are read to cover a purely software implementation, at least one of the example input port 302, the example classifier 304, the example input queue 306, the example switch fabric 308, the example forwarding table 310, the example meta-router interface 312, the example array router interface 314, and/or the example virtual interface manager 316 are hereby expressly defined to include a tangible medium such as a memory, DVD, CD, etc. Further still, the example packet aggregator 102a of FIG. 3 may include one or more elements, processes and/or devices in addition to, or instead of, those illustrated in FIG. 3, and/or may include more than one of any or all of the illustrated elements, processes and devices.

Figure 4:
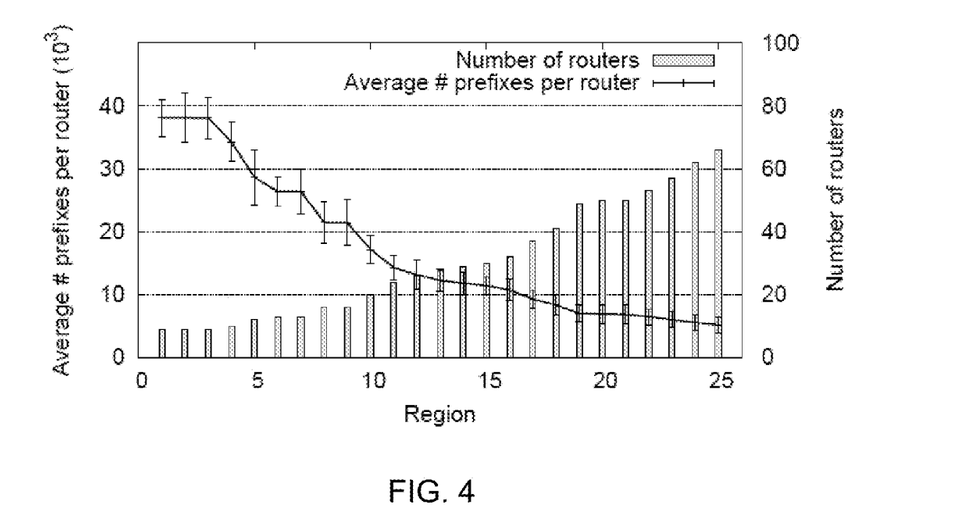
FIG. 4 illustrates a graph showing an example distribution of forwarding table entries per router corresponding to a number of routers within the example TIF router of FIGS. 1 and/or 2.

FIG. 4 illustrates a graph 400 showing an example distribution of forwarding table entries per router corresponding to a number of physical routers (e.g., the physical routers 112a-f) within the example TIF router 110 of FIGS. 1 and/or 2. The example graph 400 shows a number of routers for different regions and a resulting distribution of address prefixes based on the number of routers. In this example, IPv4 address space is partitioned based on the most significant 12 bits of the address resulting in 4096 address blocks. Further, the number of interfaces per address block that provide reachability for the corresponding addresses are determined. A distribution of address blocks is performed to minimize a deviation of interfaces per block. The example graph 400 shows the resulting distribution of prefixes per router.

The example graph 400 shows that a larger number of routers results in fewer prefixes per router, with deviations around 10% of the average number of prefixes. Because the example TIF router 110 provides routing using an array of physical routers to replace a relatively large group of network routers at the regional level, the example graph 400 indicates that the example TIF router 110 may provide an order of magnitude reduction in forwarding table size for physical routers within a TIF router 110 compared to forwarding table sizes within current routers.

Figure 5:
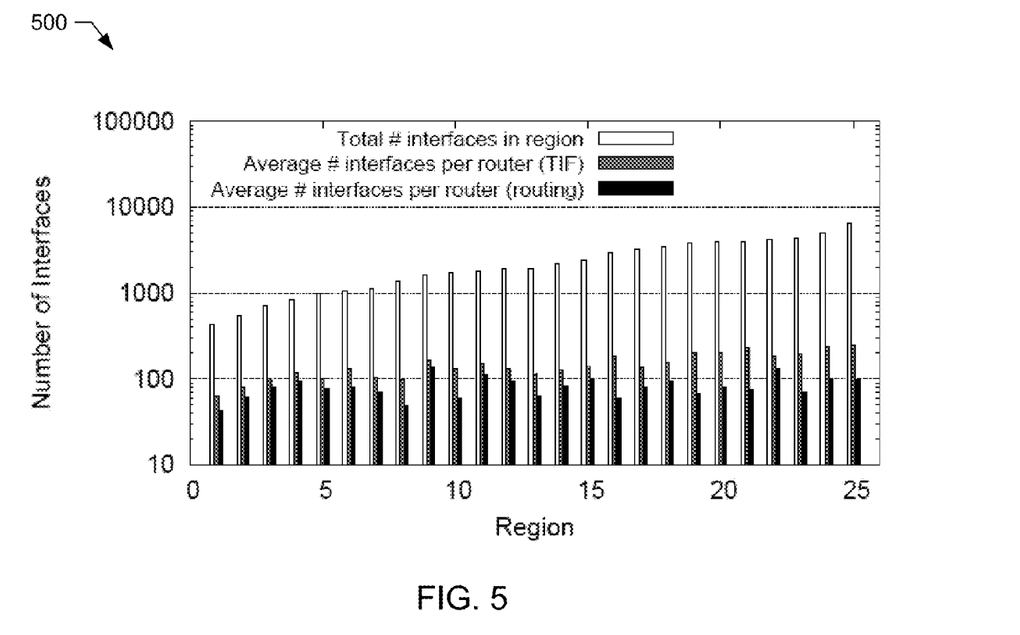
FIG. 5 illustrates a graph showing an example reduction in the average number of interfaces required at a router within the TIF router of FIGS. 1 and/or 2.

FIG. 5 illustrates a graph 500 showing an example reduction in the average number of interfaces required at a physical router within the example TIF router 110 of FIGS. 1 and/or 2. The example graph 500 shows that for the same address prefix distributions for each region shown in graph 400 of FIG. 4, the example TIF router 110 reduces the average number of interfaces per physical router. In other words, the example TIF router 110 balances interfaces and/or loads between the physical routers in a router array so that the average number of interfaces per physical router is approximately 4-15% of the total number of interfaces within a region. The example graph 500 also shows that in a routing network configuration, the average number of interfaces per router is approximately 2-11% of the total number of interfaces within the region. Thus, the number of interfaces per physical router within the example TIF router 110 is only slightly more than the number of interfaces per router in a routing network despite the fact that the physical routers within the TIF router 110 include interfaces (e.g., virtual interfaces) to each packet aggregator within the TIF router 110.

Figure 6:
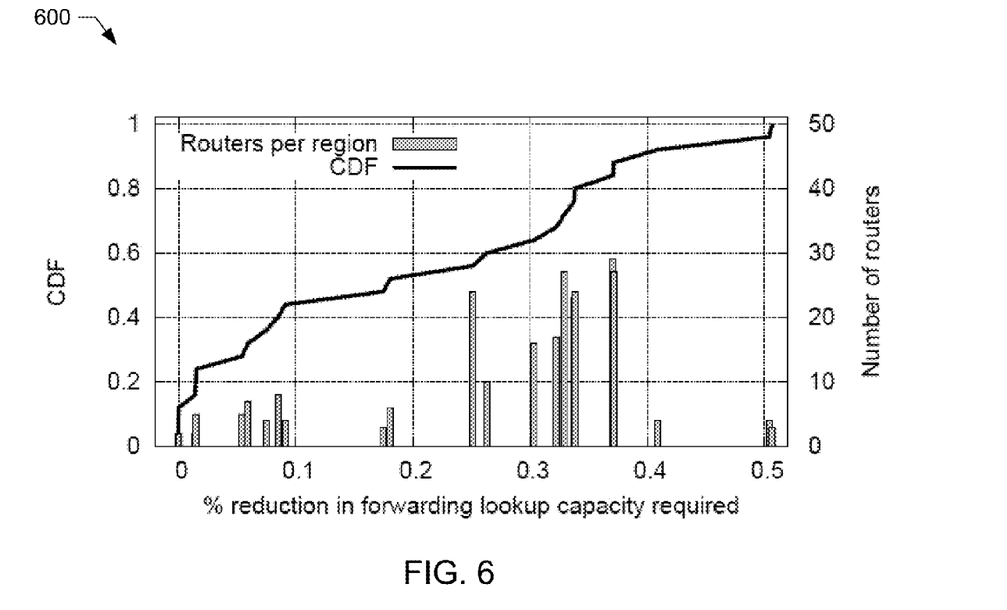
FIG. 6 illustrates a graph showing an example reduction in forwarding lookup capacity required within routers included within the example TIF router of FIGS. 1 and/or 2.

FIG. 6 illustrates a graph 600 showing an example reduction in forwarding lookup capacity required within physical routers included within the example TIF router 110 of FIGS. 1 and/or 2. The example graph 600 is calculated by monitoring packet flow of a routing network and comparing a comparable packet flow through the example TIF router 110 with a varying number of physical routers within the router array. The example graph 600 shows that for the number of routers per region shown in FIGS. 4 and 5, the example TIF router 110 provides a reduction in forwarding capacity (e.g., traffic through a router) between 0% and 50% over a cumulative distribution function (CDF) based on the number of physical routers within the TIF router 110. Specifically, the graph 600 shows a likely 30% reduction in forwarding lookup capacity for each physical router based on the 50% point of the CDF function when there are more than 10 physical routers included within the router array of the example TIF router 110.

Figure 7:
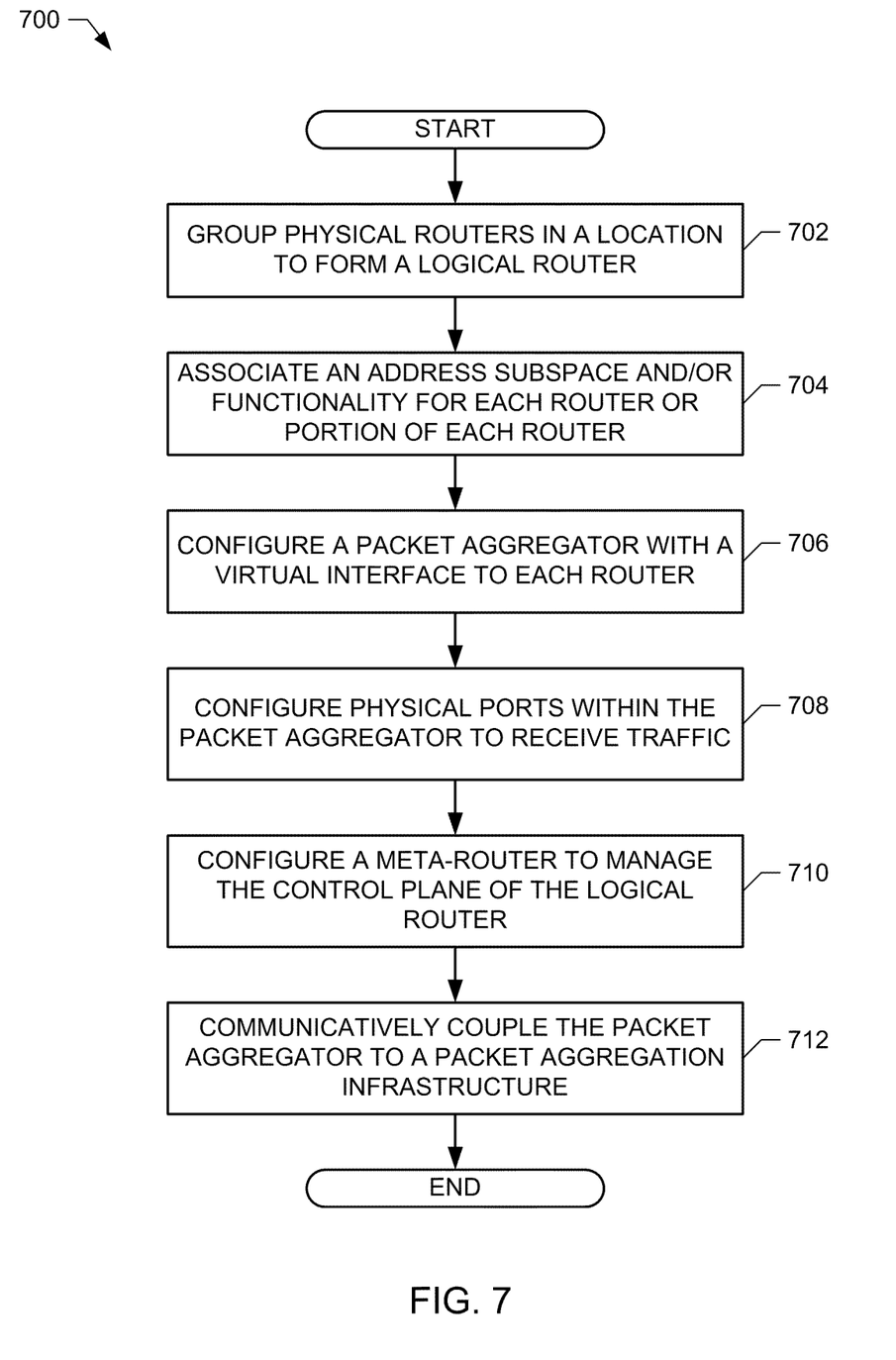
FIGS. 7 and 8 are flowcharts representative of example machine-accessible instructions that may be executed to implement the example TIF router and/or the packet aggregator of FIGS. 1, 2, and/or 3.
Figure 8:
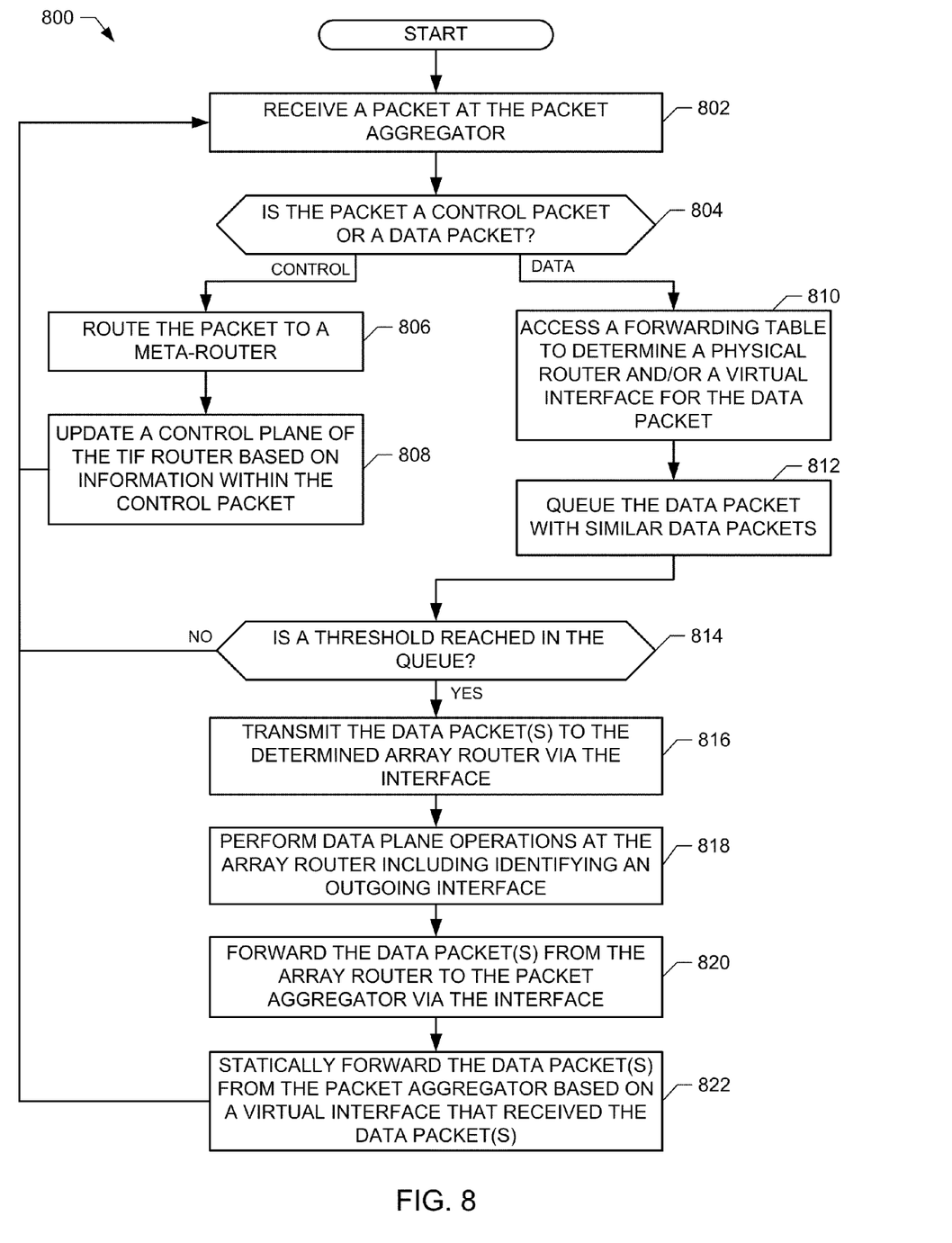

FIGS. 7 and 8 are flowcharts representative of example machine-accessible instructions that may be executed by a machine to implement the example meta-router 201, the example packet aggregators 202a-b, the example physical routers 112a-f, the example input port 302, the example classifier 304, the example input queue 306, the example switch fabric 308, the example forwarding table 310, the example meta-router interface 312, the example array router interface 314, the example virtual interface manager 316 and/or, more generally, the TIF router 110 of FIGS. 1, 2, and/or 3. The example instructions of FIGS. 7 and/or 8 may be carried out by a processor, a controller and/or any other suitable processing device. For example, the example instructions of FIGS. 7 and/or 8 may be embodied in coded instructions stored on any tangible computer-readable medium such as a flash memory, a CD, a DVD, a floppy disk, a ROM, a RAM, a programmable ROM (PROM), an electronically-programmable ROM EPROM, EEPROM, an optical storage disk, an optical storage device, magnetic storage disk, a magnetic storage device, and/or any other tangible or non-tangible medium that can be used to carry or store program code and/or instructions in the form of methods or data structures, and which can be accessed by a processor, a general-purpose or special-purpose computer, or other machine with a processor (e.g., the example processor platform P100 discussed below in connection with FIG. 9). Combinations of the above are also included within the scope of computer-readable media. Alternatively, some or all of the example instructions represented by FIGS. 7 and/or 8 may be implemented using any combination(s) of ASIC(s), PLD(s), FPLD(s), discrete logic, hardware, firmware, etc.

Also, one or more of the example instructions represented by FIGS. 7 and/or 8 may instead be implemented using manual operations or as any combination of any of the foregoing techniques, for example, any combination of firmware, software, discrete logic and/or hardware. Furthermore, many other methods of implementing the example instructions of FIGS. 7 and/or 8 may be employed. For example, the order of execution of the blocks may be changed, and/or one or more of the blocks described may be changed, eliminated, subdivided, or combined. Additionally, any or all of the example instructions of FIGS. 7 and/or 8 may be carried out sequentially and/or carried out in parallel by, for example, separate processing threads, processors, devices, discrete logic, circuits, etc.

The example instructions 700 of FIG. 7 create and/or initiate the example TIF router 110 within the example communication system 100 of FIG. 1. Multiple instances of the example instructions 700 may be executed in parallel or series to create TIF routers 110 within other portions of the communication system 100.

The example instructions 700 of FIG. 7 begin with physical routers (e.g., the physical routers 112a-f) being grouped together in a physical location to form a logical router (e.g., a router array) (block 702). Next, the example instructions 700 (e.g., the virtual interface manager 316) associate an address subspace and/or functionality with each physical router and/or for each portion of each physical router within the router array (block 704). The example instructions 700 (e.g., the virtual interface manager 316) configure one or more packet aggregators (e.g., the packet aggregators 202a-b) with a virtual interface to each physical router within the router array (block 706).

The example instructions 700 continue by configuring physical ports within the packet aggregator(s) to receive packets and/or traffic (block 708). Configuring physical ports may include assigning ports of the packet aggregator(s) to respective communication paths communicatively coupled to external routers. Next, the example instructions 700 (e.g., the virtual interface manager 316 and/or the packet aggregator(s)) configure a meta-router (e.g., the meta-router 201) to manage a control plane of the physical routers within the router array for form a control plane of the logical router (e.g., the TIF router 110) (block 710). The example instructions 700 (e.g., the virtual interface manager 316) communicatively couple the packet aggregator(s) to a packet aggregation hierarchical infrastructure (block 712). In some examples, the TIF router 110 may not include a packet aggregation infrastructure. In these examples, the example TIF router 110 may only include one level of packet aggregator(s). At this point, the example TIF router 110 is created and/or initiated and execution of the example instructions 700 ends.

The example instructions 800 of FIG. 8 route packets within the example TIF router 110 of FIGS. 1 and/or 2. Multiple instances of the example instructions 800 may be executed in parallel or series to route packets within the TIF router 110. The example instructions 800 of FIG. 8 begin when the TIF router 110 receives a packet at a packet aggregator (e.g., the packet aggregators 202a-b) (block 802). The example instructions 800 (e.g., the classifier 304) then determine if the packet is a control packet or a data packet (block 804). If the instructions 800 determine that the packet is a control packet, the packet aggregator routes the packet to the meta-router 201 via the switching fabric 308 (block 806). The example instructions 800 then (e.g., the meta-router 201) update a control plane of the TIF router 110 based on information within the control packet (block 808). Updating the control plane may include the meta-router 201 routing the control packet to an appropriate physical router within the router array to update a forwarding table. Updating the control plane within the TIF router 110 may also include updating the forwarding table 310 within the packet aggregator. The example instructions 800 (e.g., the TIF router 110) continue by returning to receiving a packet at the packet aggregator (block 802).

However, if the example instructions 800 determines that the packet is a data packet (block 804), the example instructions (e.g., the packet aggregators 202a-b) access the forwarding table 310 to determine a physical router and/or a virtual interface (e.g., an outgoing interface) for the data packet (block 810). Upon determining a physical router and/or a virtual interface, the example instructions 800 (e.g., the input queue 306) queue the data packet with similar data packets (block 812). In some examples, the instructions 800 may queue the data packet prior to accessing the forwarding table 310.

The example instructions 800 continue with the input queue 306 determining if the threshold is reached (block 814). If the threshold is not reached, the example instructions 800 return to receiving packets at the packet aggregator (block 802). However, if the threshold is reached, the example instructions 800 (e.g., the switch fabric 308) transmit the similar data packet(s) in the queue to the determined physical router via the virtual interface within the array router interface 314 (block 816). The example instructions 800 (e.g., the physical router) then perform data plane operations on the data packet(s) (block 818). Data plane operations may include identifying an outgoing interface to transmit the data packet(s) to a destination specified within a header of the data packet(s).

Upon identifying an outgoing interface, the example instructions 800 (e.g., the physical router) transmit the data packet(s) to the packet aggregator via the virtual interface (block 820). The example instructions 800 (e.g., the packet aggregators 202a-b) statically forward the data packet(s) to an external router and/or destination based on the virtual interface that received the data packet(s) (block 822). The example instructions 800 (e.g., the TIF router 110) continue by receiving a packet at the packet aggregator (block 802).

Figure 9:
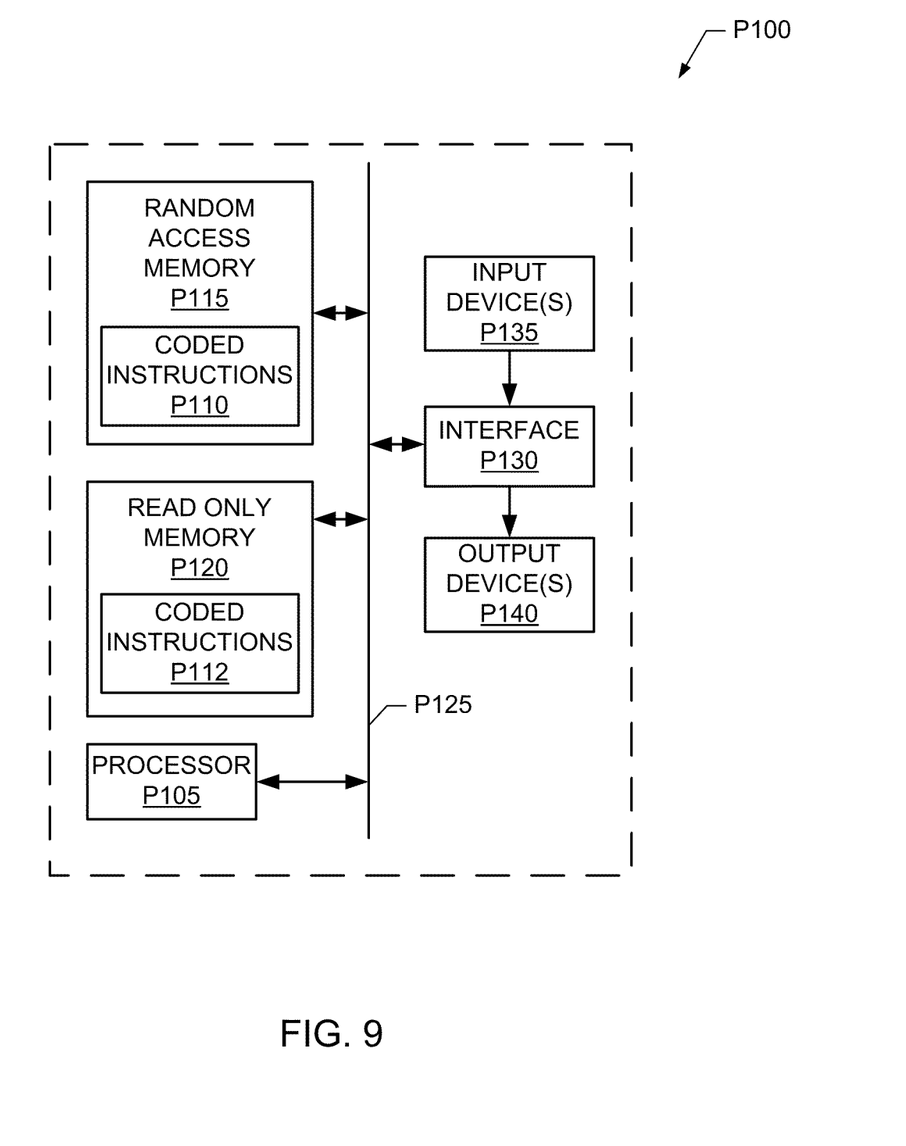
FIG. 9 is a schematic illustration of an example processor platform that may be used and/or programmed to execute the example instructions of FIGS. 7 and/or 8 to implement any of all of the example methods and apparatus disclosed herein.

FIG. 9 is a schematic diagram of an example processor platform P100 that may be used and/or programmed to execute the instructions of FIGS. 7 and/or 8 to implement the example meta-router 201, the example packet aggregators 202a-b, the example physical routers 112a-f, the example input port 302, the example classifier 304, the example input queue 306, the example switch fabric 308, the example forwarding table 310, the example meta-router interface 312, the example array router interface 314, the example virtual interface manager 316 and/or, more generally, the TIF router 110 of FIGS. 1, 2, and/or 3. For example, the processor platform P100 can be implemented by one or more general-purpose processors, processor cores, microcontrollers, etc.

The processor platform P100 of the example of FIG. 9 includes at least one general purpose programmable processor P105. The processor P105 executes coded instructions P110 and/or P112 present in main memory of the processor P105 (e.g., within a RAM P115 and/or a ROM P120). The coded instructions P110 and/or P112 may be the instructions of FIGS. 7 and/or 8. The processor P105 may be any type of processing unit, such as a processor core, a processor and/or a microcontroller. The processor P105 may execute, among other things, the example processes of FIGS. 7 and/or 8 to implement the example methods, articles of manufacture, and apparatus described herein.

The processor P105 is in communication with the main memory (including a ROM P120 and/or the RAM P115) via a bus P125. The RAM P115 may be implemented by DRAM, SDRAM, and/or any other type of RAM device, and ROM may be implemented by flash memory and/or any other desired type of memory device. Access to the memory P115 and the memory P120 may be controlled by a memory controller (not shown). One or both of the example memories P115 and P120 may be used to implement the example forwarding table 310 of FIG. 3.

The processor platform P100 also includes an interface circuit P130. The interface circuit P130 may be implemented by any type of interface standard, such as an external memory interface, serial port, general-purpose input/output, etc. One or more input devices P135 and one or more output devices P140 are connected to the interface circuit P130.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are stored on a tangible storage medium, such as: a magnetic medium (e.g., a magnetic disk or tape); a magneto-optical or optical medium such as an optical disk; or a solid state medium such as a memory card or other package that houses one or more read-only (non-volatile) memories, random access memories, or other re-writable (volatile) memories. Accordingly, the example software and/or firmware described herein can be stored on a tangible storage medium such as those described above or successor storage media.

To the extent the above specification describes example components and functions with reference to particular standards and protocols, it is understood that the scope of this patent is not limited to such standards and protocols. For instance, each of the standards for internet and other packet-switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Additionally, although this patent discloses example apparatus including software or firmware executed on hardware, it should be noted that such apparatus are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example apparatus, methods and articles of manufacture, the examples are not the only way to implement such apparatus, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method to route packets in a network, the method comprising:
   accessing, using a processor, a first forwarding table to determine a first router within a router array to which a first packet received at a packet aggregator is to be forwarded;
   transmitting the first packet from the packet aggregator to the first router via a first virtual interface of the packet aggregator;
   based on a subsequent routing decision made by the first router, receiving the first packet from the first router at a second virtual interface of the packet aggregator; and
   statically forwarding, using the processor, the first packet from the packet aggregator to a destination of the first packet based on the second virtual interface that received the first packet, wherein the first router within the router array is determined by matching at least part of an address associated with the destination of the first packet to a first address subspace associated with the first router, the first router is to make the subsequent routing decision by accessing a second forwarding table within the first router and matching at least a part of the address associated with the destination of the first packet to a second address subspace associated with the second virtual interface, and the method further comprises, prior to accessing the forwarding table:
   determining a second router is inoperable;
   updating the first forwarding table by combining a third address subspace associated with the second router with the first address subspace associated with the first router; and
   updating the second forwarding table within the first router by combining a fourth address subspace associated with a third virtual interface of the packet aggregator with the second address subspace associated with the second virtual interface of the packet aggregator.

2. The method as defined in claim 1, further comprising, upon receiving a second packet at the packet aggregator:
   determining if the second packet is a control packet or a data packet;

determining a third router within the router array to which the second packet is to be forwarded if the second packet is a data packet; and forwarding the second packet to a meta-router and updating a control plane of at least one of a plurality of routers in the router array based on information within the second packet if the second packet is a control packet.

3. The method as defined in claim 1, further comprising, prior to transmitting the first packet:

queuing the first packet with similar packets; and transmitting the queued packets to the first router based on a threshold.

4. The method as defined in claim 1, wherein determining the first router includes determining the first virtual interface of the packet aggregator to transmit the first packet to the first router.

5. The method as defined in claim 4, wherein the first virtual interface of the packet aggregator is associated with the first address subspace associated with the first router.

6. The method as defined in claim 1, further comprising performing data plane operations on the first packet within the first router prior to the first packet being received via the second virtual interface.

7. The method as defined in claim 1, wherein the first virtual interface is determined based on an interface of the packet aggregator that initially received the first packet.

8. An apparatus to route packets in a network, the apparatus comprising:

a memory having machine readable instructions stored thereon; and a processor to execute the instructions to perform operations comprising:

accessing a first forwarding table to determine a first router within a router array to which a first packet received at the apparatus is to be forwarded;

transmitting the first packet from the apparatus to the first router via a first virtual interface of the apparatus;

based on a subsequent routing decision made by the first router, receiving the first packet from the first router at a second virtual interface of the apparatus; and statically forwarding the first packet to a destination of the first packet based on the second virtual interface that received the first packet, wherein the processor is to determine the first router within the router array by matching at least part of an address associated with the destination of the first packet to an address subspace associated with the first router, the first router is to make the subsequent routing decision by accessing a second forwarding table within the first router and matching at least part of the address associated with the destination of the first packet to a second address subspace associated with the second virtual interface, and the operations further comprise:

determining a second router is inoperable;

updating the first forwarding table by combining a third address subspace associated with the second router with the first address subspace associated with the first router; and updating the second forwarding table within the first router by combining a fourth address subspace associated with a third virtual interface of the apparatus with the second address subspace associated with the second virtual interface of the apparatus.

9. The apparatus as defined in claim 8, wherein the operations further comprise:

determining if a second packet received at the apparatus is a control packet or a data packet;

determining a third router within the router array to which the second packet is to be forwarded if the second packet is a data packet; and forwarding the second packet to a meta-router if the second packet is a control packet.

10. The apparatus as defined in claim 9, wherein the meta-router is to update a control plane of at least one of a plurality of routers in the router array based on information within the second packet if the second packet is a control packet.

11. The apparatus as defined in claim 8, further comprising an input queue to queue the first packet with similar packets.

12. The apparatus as defined in claim 8, wherein the processor is to determine the first router by identifying the first virtual interface of the apparatus by which the first packet is to be transmitted to the first router.

13. A machine-accessible storage device comprising instructions stored thereon that, when executed, cause a machine to perform operations comprising:

accessing a first forwarding table to determine a first router within a router array to which a first packet received at a packet aggregator is to be forwarded;

transmitting the first packet from the packet aggregator to the first router via a first virtual interface of the packet aggregator;

based on a subsequent routing decision made by the first router, receiving the first packet from the first router at a second virtual interface of the packet aggregator; and statically forwarding the first packet to a destination of the first packet based on the second virtual interface that received the first packet, wherein the first router within the router array is determined by matching at least part of an address associated with the destination of the first packet to a first address subspace associated with the first router, the first router is to make the subsequent routing decision by accessing a second forwarding table within the first router and matching at least a part of the address associated with the destination of the first packet to a second address subspace associated with the second virtual interface, and the operations further comprise, prior to accessing the forwarding table:

determining a second router is inoperable;

updating the first forwarding table by combining a third address subspace associated with the second router with the first address subspace associated with the first router; and updating the second forwarding table within the first router by combining a fourth address subspace associated with a third virtual interface of the packet aggregator with the second address subspace associated with the second virtual interface of the packet aggregator.

14. The machine-accessible storage device as defined in claim 13, wherein the operations further comprise:

determining if the second packet is a control packet or a data packet;

determining a third router within the router array to which the second packet is to be forwarded if the second packet is a data packet; and forwarding the second packet to a meta-router and updating a control plane of at least one of a plurality of routers in the router array based on information within the second packet if the second packet is a control packet.

15. The machine-accessible storage device as defined in claim 13, wherein the operations further comprise, prior to transmitting the first packet:

queuing the first packet with similar packets; and transmitting the queued packets to the first router based on a threshold.

16. The machine-accessible storage device as defined in claim 13, wherein determining the first router includes determining the first virtual interface of the packet aggregator to transmit the first packet to the first router.

17. The machine-accessible storage device as defined in claim 16, wherein the first virtual interface of the packet aggregator is associated with the first address subspace associated with the first router.

18. The machine-accessible storage device as defined in claim 13, wherein the operations further comprise performing data plane operations on the first packet within the first router prior to the first packet being received via the second virtual interface.

19. The machine-accessible storage device as defined in claim 13, wherein the first virtual interface is determined based on an interface of the packet aggregator that initially received the first packet.

* * * * *